United States Patent [19]

Grodziski

[11] Patent Number: 6,076,373

[45] Date of Patent: *Jun. 20, 2000

[54] APPARATUS AND METHOD FOR BENDING GLASS SHEETS

[75] Inventor: Zenon Grodziski, Aniche, France

[73] Assignee: PPG Industries Ohio, Inc., Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/876,872

[22] Filed: Jun. 16, 1997

[51] Int. Cl.[7] .......................... C03B 21/00; C03B 23/00; C03B 23/02; C03B 25/00

[52] U.S. Cl. .................. 65/107; 65/287; 65/289; 65/290; 65/291

[58] Field of Search ................ 65/106, 107, 273, 65/287, 289, 290, 291

[56] References Cited

U.S. PATENT DOCUMENTS

| | | | |
|---|---|---|---|
| 2,452,488 | 10/1948 | Paddock et al. . | |
| 2,554,572 | 5/1951 | Jendrisak . | |
| 2,608,039 | 8/1952 | Jendrisak | 49/67 |
| 2,695,476 | 11/1954 | Jendrisak . | |
| 2,702,445 | 2/1955 | Jendrisak . | |
| 2,920,423 | 1/1960 | Carson et al. | 49/67 |
| 3,235,350 | 2/1966 | Richardson | 65/107 |
| 3,269,822 | 8/1966 | Carson et al. . | |
| 3,356,480 | 12/1967 | Golightly . | |
| 3,511,628 | 5/1970 | Adamson . | |
| 4,047,916 | 9/1977 | Reese et al. | 65/106 |
| 4,119,424 | 10/1978 | Comperatore | 65/107 |
| 4,203,751 | 5/1980 | Roth et al. | 65/106 |
| 4,265,650 | 5/1981 | Reese et al. | 65/104 |
| 4,286,980 | 9/1981 | Matsuzaki | 65/106 |
| 4,596,592 | 6/1986 | Frank . | |
| 4,606,749 | 8/1986 | Nushi et al. | 65/106 |
| 4,626,267 | 12/1986 | Reese et al. | 65/106 |
| 4,741,751 | 5/1988 | Claassen et al. . | |
| 4,804,397 | 2/1989 | Stas et al. | 65/107 |
| 4,894,080 | 1/1990 | Reese et al. | 65/106 |
| 5,049,178 | 9/1991 | Pereman et al. | 65/106 |
| 5,087,281 | 2/1992 | Kakino et al. | 65/290 |
| 5,167,689 | 12/1992 | Weber | 65/106 |
| 5,186,730 | 2/1993 | Weber | 65/289 |
| 5,383,990 | 1/1995 | Tsuji | 156/102 |
| 5,660,609 | 8/1997 | Muller et al. . | |
| 5,849,057 | 12/1998 | Didelot | 65/106 |

FOREIGN PATENT DOCUMENTS

| | | |
|---|---|---|
| 0 640 569 | 3/1995 | European Pat. Off. . |
| 0 705 798 | 4/1996 | European Pat. Off. . |
| 96/12682 | 5/1996 | WIPO . |

*Primary Examiner*—Stanley S. Silverman
*Assistant Examiner*—Jacqueline A. Ruller
*Attorney, Agent, or Firm*—Andrew C. Siminerio; Donald C. Lepiane

[57] ABSTRACT

The present invention provides an apparatus and method for a shaping sheet including a support frame and a shaping rail supported on the frame. The shaping rail has a sheet shaping surface that conforms in elevation and outline to a final desired shape of a marginal edge of a glass sheet to be shaped. An auxiliary rail having a sheet shaping surface which generally corresponds to a preliminary shape of a selected marginal edge portion of the sheet is positioned along a section of the shaping rail having a sheet shaping surface portion which generally corresponds to the final desired shape of the selected marginal edge portion of the sheet. The auxiliary rail is mounted for movement relative to the shaping rail section from a first position, wherein portions of the sheet shaping surface of the auxiliary rail are above the sheet shaping surface portion of the shaping rail section, and a second position wherein the sheet shaping surface of the auxiliary rail is positioned below the sheet shaping surface portion of the shaping rail section. When the auxiliary rail is in its first position, it is capable of supporting the selected marginal edge portion of the sheet above the shaping rail section and preliminarily shaping the sheet. When the auxiliary rail is in its second position, the sheet shaping surface portion of the shaping rail section is capable of supporting and shaping the selected marginal edge portion of the sheet to the final desired shape.

22 Claims, 5 Drawing Sheets

APPARATUS AND METHOD FOR BENDING GLASS SHEETS

BACKGROUND OF THE INVENTION

1. Field of the Invention

This invention relates to sag bending of glass sheets on bending molds and, in particular, to an apparatus and method for controlling the sag bending along selected portions of the glass sheets while moving the sheets on bending molds through a heating lehr.

2. Technical Considerations

In the practice of sag bending to form shaped glass windows for automobiles and the like, as disclosed in U.S. Pat. No. 4,375,978 to Reese, a glass sheet is supported on a skeletal bending mold. The shaping rail of the mold has a shape and configuration similar to that of the shaped glass sheet at a location slightly inboard of its peripheral edge. The bending molds are then conveyed in succession through a heating lehr where the glass sheet is heated to its deformation temperature such that it begins to sag by gravity until the glass sheet conforms to the configuration of the shaping rail. After the glass sheet is shaped, the mold is conveyed through an annealing zone where the glass sheet is cooled in a controlled manner from its deformation temperature through its annealing range to anneal the glass sheet. This gravity sag bending technique has been used to simultaneously shape two glass sheets, or doublets, which sheets are subsequently laminated together to form an automobile windshield.

As automotive stylists strive for more aerodynamic designs, the windshields are assuming more complex and deeper bend configurations, which are increasingly more difficult to form by conventional sag bending operations. It has been found that in producing shaped glass doublets with a deep curvature along its center line, because of the amount of heat and length of time required to achieve such a deep sag, portions of the glass in the vicinity of the shaping rails are prone to excessive sag bending.

Various arrangements have been developed to assist in controlling the shape of the glass sheets. In U.S. Pat. Nos. 4,265,650 and 4,894,080 to Reese et al., the glass sheets are pressed against one press face or between two opposing press faces. In U.S. Pat. Nos. 4,804,397 to Stas et al. and U.S. Pat. No. 5,049,178 to Pereman et al., partial presses are used to contact and press selected portions of the glass sheets. These shaping methods positively form the sheets to the desired configuration, but because the press faces contact the glass surfaces, there may be some marking. U.S. Pat. No. 5,167,689 to Weber controls bending at the corners of glass sheets supported on an outline mold by sag bending the sheets to a preliminarily curved configuration and subsequently lifting selected peripheral portions of the sheet off the curved shaping rails with additional shaping rails having the final desired elevational configuration. This arrangement reduces reverse bending at the corners of the glass sheets but does not address the problem of excessive sag of the glass near the shaping rails.

It would be advantageous to develop an apparatus and method for forming glass sheets while controlling excessive deformation of the glass in the vicinity of the peripheral shaping rails.

SUMMARY OF THE INVENTION

The present invention provides an apparatus and method for a shaping sheet including a support frame and a shaping rail supported on the frame. The shaping rail has a sheet shaping surface that conforms in elevation and outline to a final desired shape of a marginal edge of a glass sheet to be shaped. An auxiliary rail having a sheet shaping surface which generally corresponds to a preliminary shape of a selected marginal edge portion of the sheet is positioned along a section of the shaping rail having a sheet shaping surface portion which generally corresponds to the final desired shape of the selected marginal edge portion of the sheet. The auxiliary rail is mounted for movement relative to the shaping rail section from a first position, wherein portions of the sheet shaping surface of the auxiliary rail are above the sheet shaping surface portion of the shaping rail section, and a second position wherein the sheet shaping surface of the auxiliary rail is positioned below the sheet shaping surface portion of the shaping rail section. When the auxiliary rail is in its first position, it is capable of supporting the selected marginal edge portion of the sheet above the shaping rail section and preliminarily shaping the sheet. When the auxiliary rail is in its second position, the sheet shaping surface portion of the shaping rail section is capable of supporting and shaping the selected marginal edge portion of the sheet to the final desired shape.

DETAILED DESCRIPTION OF THE INVENTION

The invention as discussed herein is presented in combination with a conventional stop-and-go type heating lehr, wherein the glass sheets are supported on shaping rails within separate heating chambers that are sequentially conveyed through the lehr to heat and shape the glass sheets, in a manner well known in the art. It should be appreciated that the present invention may be incorporated into the sag bending operation of glass sheets using other types of heating lehrs, e.g. conventional tunnel-type lehrs.

Figure 1:
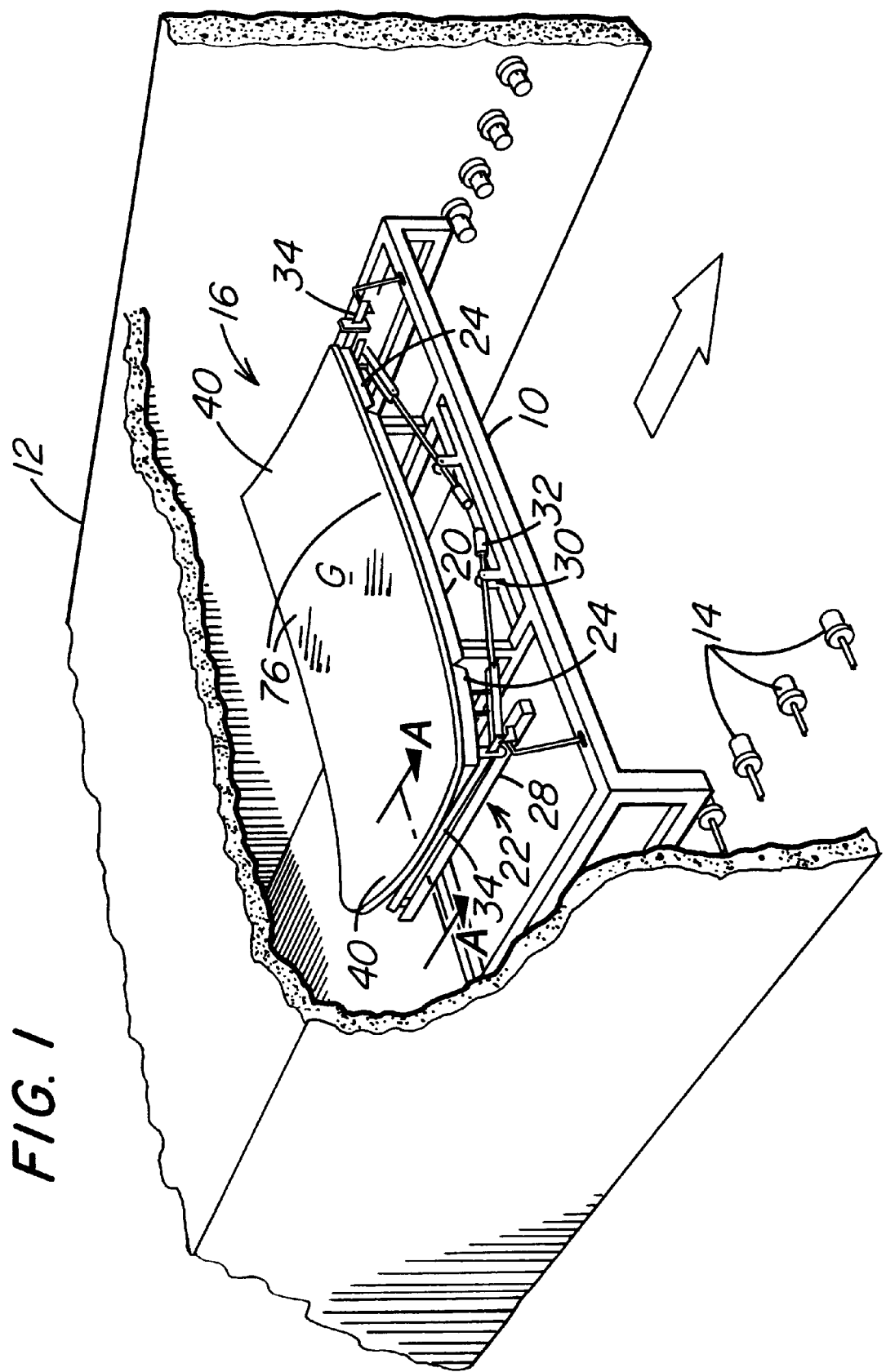
FIG. 1 is a perspective cutaway view of a heating lehr showing glass sheets supported on an outline ring mold incorporating the present invention, with portions removed for clarity.

In the process of shaping glass sheets by gravity sag bending, one or more glass sheets G are positioned on a carrying frame 10 at a loading station (not shown) and conveyed through a heating lehr 12, where they are heated to their heat-softening temperature and allowed to sag by gravity to a desired shaped configuration. After shaping, the sheets G and frame 10 are conveyed through annealing and cooling zones of the lehr 12 to minimize stresses in the glass and set the glass shape. Referring to FIG. 1, a conveyor comprised of a plurality of stub rolls 14 disposed in transversely opposing, longitudinally spaced relation extend the entire length of the lehr 12 and defines a path of movement of frame 10 along a longitudinal reference line through the lehr. Each stub roll 14 is mounted on a shaft that extends through a side wall of the lehr 12 and is connected to a conveyor drive means (not shown). The conveyor may be divided into a number of sections, each driven from its own drive means, or the conveyor sections may be driven from a common drive through clutches, in any manner well known in the art.

Although not limiting the present invention, the frame 10 illustrated in FIG. 1 includes a ring mold 16, similar to the mold disclosed in U.S. Pat. No. 4,626,267 to Reese and U.S. Pat. No. 4,804,397 to Stas et al., which teachings are herein incorporated by reference, having a sheet shaping surface 18 that conforms in elevation and outline to a final desired shape of the marginal edge of the glass sheets G to be shaped. Frame 10 may include other insulating structures (not shown) which enclose the frame 10 and isolate it from adjacent frames. In this particular embodiment, mold 16 is an articulating mold with pivoting end sections; however, it should be appreciated that the present invention may be used in combination with a non-articulating ring mold. The mold 16 is provided with opposed, spaced-apart central rails 20 (only one shown in FIG. 1) and two pivoting end sections 22, each of which includes side rails 24 and an end rail 26. Each end section 22 is supported by an outrigger 28 positioned below the corresponding rails 24 and 26. The outrigger 28 extends outward of the end sections 22 towards a pivot on post 30 and is attached to a weighted lever arm 32. As the glass sheets G supported on ring mold 16 are heated, the lever arm 32 moves downward under the force of gravity against the lessening opposing force of the glass sheets G as they become heat softened to pivot the end sections 22 upward to a closed position as shown in FIG. 1. In this closed position, rails 20, 24 and 26 form shaping surface 18 and the glass sheets G sag by gravity into contact and are shaped by surface 18 slightly inboard of their periphery.

The following discussion is directed towards using an additional shaping rail on one of the pivoting end sections 22 to control glass shape during a gravity sag bending operation, but it should be understood that, if required, the additional rails may be similarly positioned along portions of center rails 20 or end section rails 24 and 26 at the opposite end of mold 16.

Figure 2:
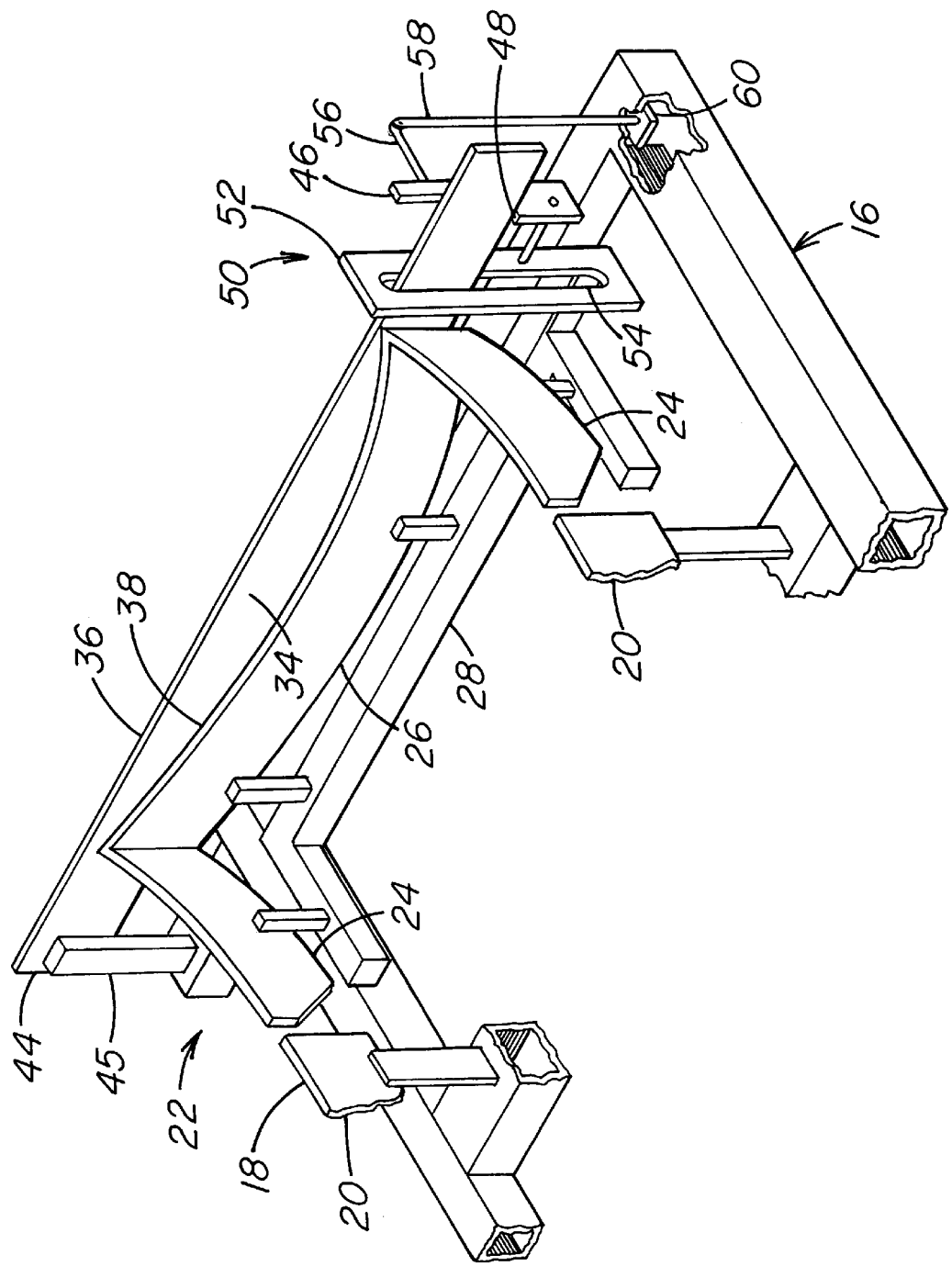
FIG. 2 is an enlarged perspective view of a pivoting wing section of the ring mold illustrated in FIG. 1, with portions removed for clarity.
Figure 3:
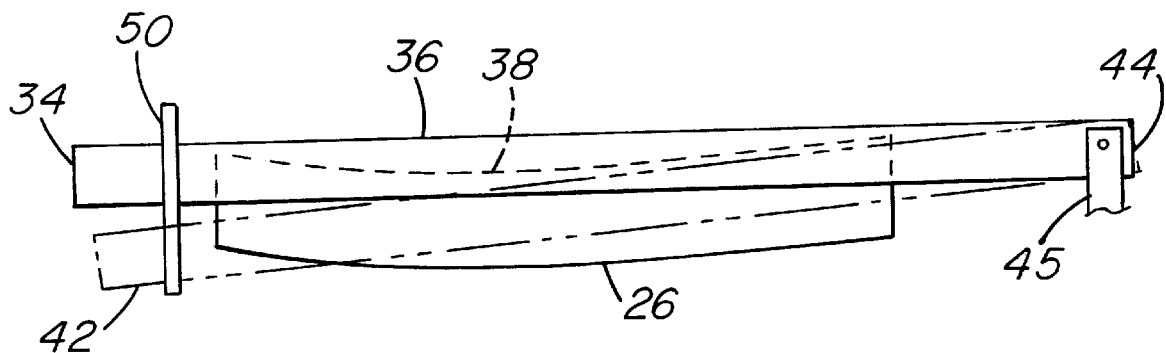
FIG. 3 is an end view of the pivoting wing section of the ring mold illustrated in FIG. 1 showing an auxiliary rail in a raised and lowered position, with portions removed for clarity.

Referring to FIG. 2, end section 22 of mold 16 further includes an auxiliary rail 34 which extends along and is positioned adjacent to end rail section 26 of end section 22. Auxiliary rail 34 is supported on frame 10 to move between a raised position wherein the upper sheet shaping surface 36 of auxiliary rail 34 is generally positioned above the upper sheet shaping surface 38 of adjacent rail 26 as illustrated in FIGS. 1, 2 and 3, to support and preliminarily shape a marginal edge portion 40 of the glass sheets G, and a lowered position wherein surface 36 of auxiliary rail 34 is positioned below surface 38 of adjacent end rail 26 as illustrated by phantom lines 42 in FIG. 3 such that rail 26 can support and shape marginal edge portion 40 to its final desired configuration during a portion of the sag bending process. In particular, the elevational profile of shaping surface 36 is configured to have a curvature which is less than that of surface 38 of adjacent rail 26 so that as long as marginal edge portion 40 is supported on auxiliary rail 40, it cannot sag to its final configuration. By delaying the final sag bending of the sheets G, and, in particular, marginal edge portion 40 and those portions of the sheets in the vicinity of edge portion 40 within end section 22, until late in the sag bending operation, as will be discussed later in more detail, the amount of time available for those areas of the glass sheets G to sag by gravity is reduced so that the sheets cannot sag excessively in these critical areas. Although not limiting in the present invention, in the particular embodiment illustrated in FIGS. 1–3, shaping surface 36 of auxiliary rail 34 has a straight profile, i.e. there is no vertical curvature along its length and is positioned so that it is aligned slightly above the highest points of adjacent rail 26.

Auxiliary rail 34 may be moved from its raised position to its lowered position either by gravity or a mechanical or electro-mechanical device. Without limiting the scope of the present invention, FIGS. 2 and 3 illustrate one embodiment of a gravity-type arrangement. More specifically, end 44 of rail 34 is mounted to pivot about post 45. A bracket 46, which includes a ledge 48, is pivotally secured to outrigger 28 or a guide 50 of pivoting section 22. When in its raised position, rail 34 is supported at one end by post 45 and its opposing end is seated on ledge 48. At a predetermined time during the glass sheet sag bending process, bracket 46 is pivoted away from rail 34 causing the rail 34 to move off ledge 48 and slides downward, as shown by phantom lines 42 in FIG. 3, pivoting about post 45. Guide 50 maintains auxiliary rail 34's position generally along adjacent rail 26. In the particular embodiment illustrated in FIG. 2, guide 50 includes a plate 52 with a slot 54 through which rail 34 extends and slides along.

Figure 4:
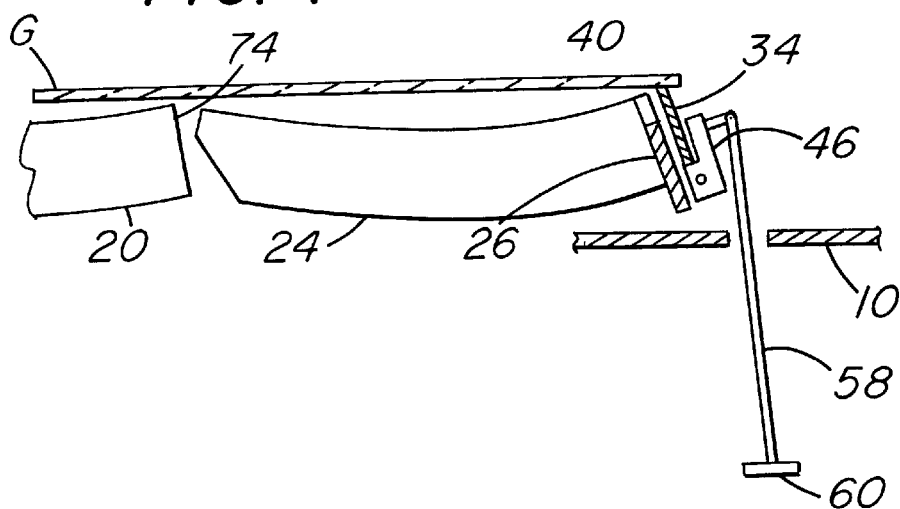
FIGS. 4, 5 and 6 are schematic sectional views of the pivoting section of the ring mold illustrated in FIG. 1 taken along line A—A at different stages during a glass sheet sag bending operation, with portions removed for clarity.
Figure 5:
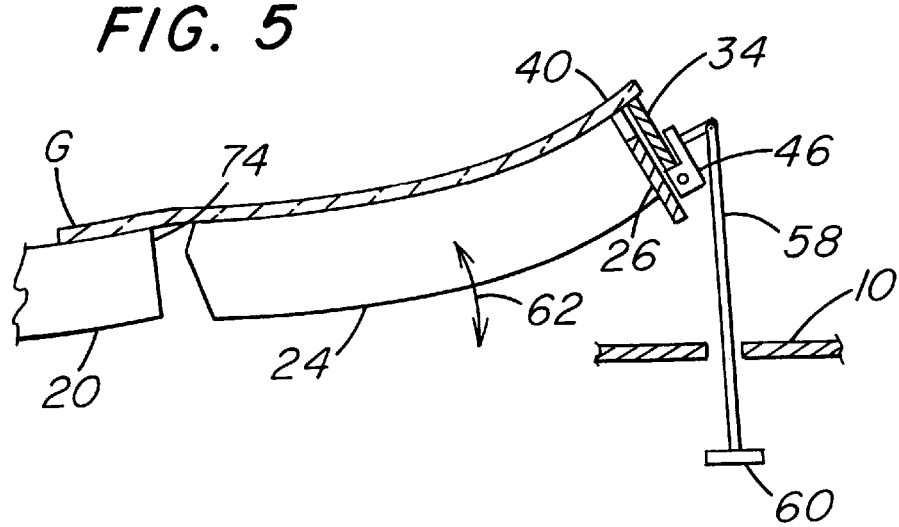
Figure 6:
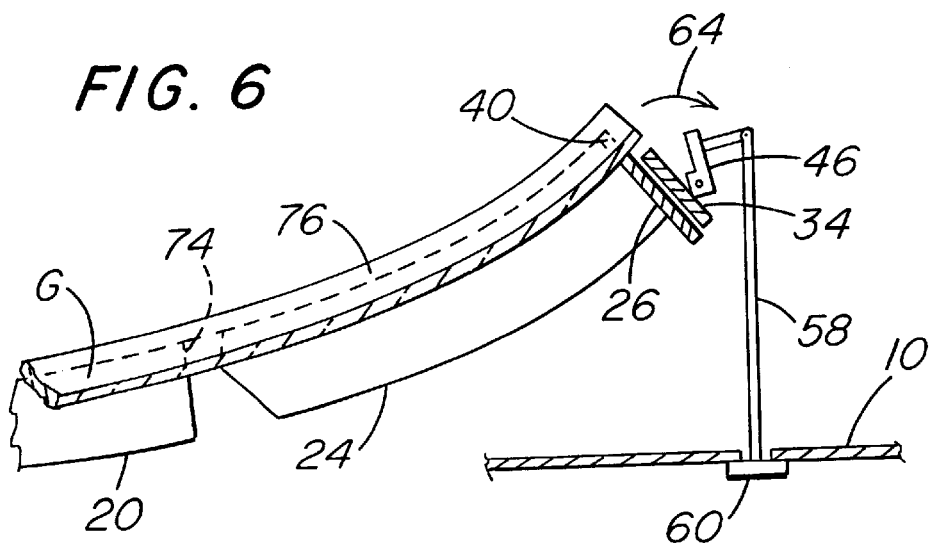

Although not limiting in the present invention, the pivoting action of bracket 46 occurs when end section 22 of mold 16 pivots upward a predetermined amount. More particularly, referring to FIGS. 4 through 6, arm 56 extends from bracket 46 and includes a pivoting rod 58 that extends through a portion of frame 10. Stop 60 is secured to rod 58 such that when end section 22 of mold 16 is pivoted downward to an opened position, the stop 60 is spaced from frame 10, as illustrated in FIG. 4. As the glass sheets G supported on rails 20, 24 and 34 are heated and softened, pivoting end section 22 begins to rotate upward, as indicated by arrow 62 in FIG. 5, to slowly obtain the final desired elevational contour of the sheet. Bracket 46 moves with section 22 as it pivots and continues to hold rail 34 in its raised position as shown in FIG. 5. As end section 22 pivots, rod 58 moves upward, moving stop 60 closer to frame 10. When end section 22 has pivoted upward a predetermined amount, stop 60 will contact frame 10. As end section 22 continues to pivot upward, bracket 46 is prevented from maintaining its orientation relative to rail 34 and is forced to pivot, as indicated by arrow 64, which results in rail 34 falling off ledge 48 and dropping to its lowered position, as illustrated in FIG. 6 and depositing the sheet onto end rail 26.

Although in the embodiment of the invention illustrated in FIGS. 1–3, bracket 46 is positioned at one end of rail 34; it should be appreciated that it may be positioned at any other location along rail 34, for example, at its center. It should be further appreciated that other types of devices may be used to move rail 34 from its raised position to its lowered position. For example, bracket 46 may be replaced with a linear actuator, such as an electric motor, ball screw, electric motor, or the like, to raise and lower one end of rail 34.

Figure 7:
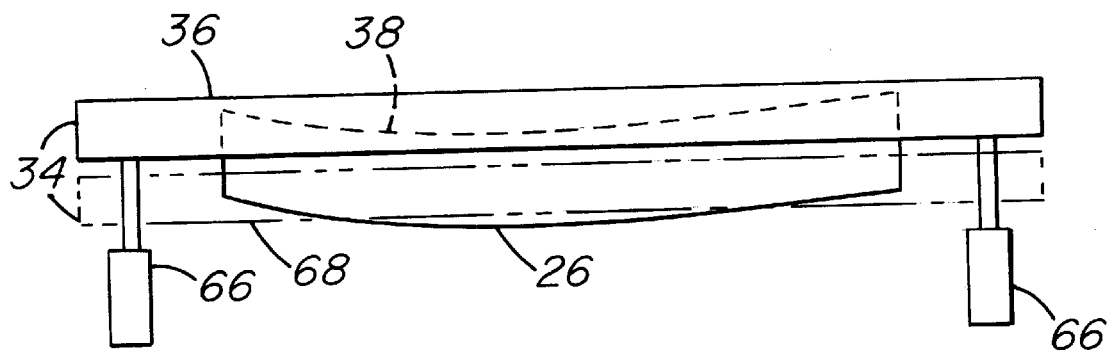
FIG. 7 is an end view of an alternate embodiment of the ring mold of the present invention, with portions removed for clarity, showing an auxiliary rail in a raised and lowered position.

It is also contemplated that rather than pivotally mounting the auxiliary rail 34 at one end and using a support device to move its opposing end, the rail 34 may be vertically reciprocated between its raised and lowered positions. More specifically, referring to FIG. 7, opposing ends of rail 34 may be supported by linear actuators 66, as discussed above, to move both ends of rail 34 upward to its raised position and downward to its lowered position, as indicated by phantom lines 68. These types of actuators may be linked to a controller (not shown) which controls the raising and lowering of rail 34 during the gravity sag bending operation.

Figure 8:
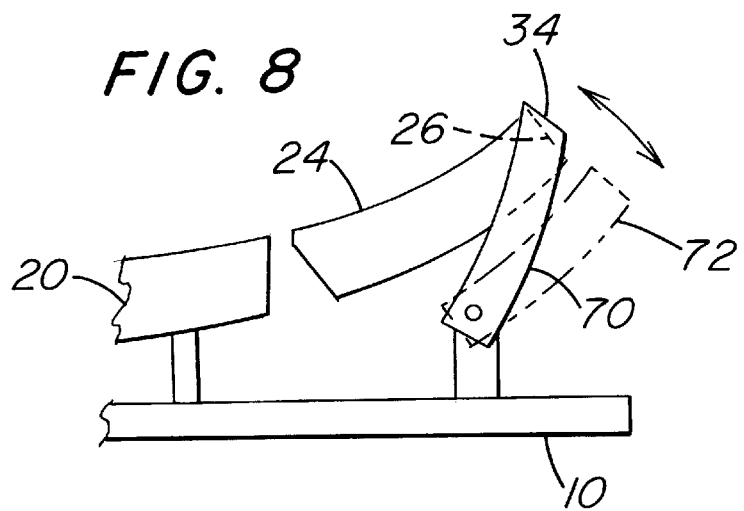
FIG. 8 is a side view of another embodiment of the ring mold of the present invention, with portions removed for clarity, showing an auxiliary rail in a raised and lowered position.

It is further contemplated that rather than vertically reciprocating rail 34, the rail 34 may be moved from its raised to lowered position by a pivoting action. More specifically, referring to FIG. 8, rail 34 may include additional sections 70 (only one shown in FIG. 8) which are pivotally mounted to frame 10 so that rather than simply dropping from its raised to lowered position, rail 34 and additional sections 70 rotate away from adjacent rail 26, as indicated by phantom lines 72. The rail 34 and section 70 may be raised and lowered in a manner as previously discussed.

As rail 34 moves from its raised to lowered position, marginal edge portion 40 of the glass sheet G is transferred from the upper shaping surface 36 of auxiliary rail 34 to the upper shaping surface 38 of rail 26. As discussed earlier, the movement of rail 34 to its lowered position may occur at any desired time during the sag bending cycle. However, in determining when auxiliary rail 34 may be lowered, it should be remembered that there must be sufficient time after the glass sheets G have been transferred from rail 34 onto rail 26 for the glass G to sag by gravity into contact with shaping surface 38 of rail 26 and assume its final configuration. More specifically, at a sag bending temperature of between about 1060 to 1250° F. (571 to 677° C.), it is estimated that it will take approximately 10 to 20 seconds for the glass G to sag into contact with rail 26 after being deposited thereon, depending on the depth of bend provided by the shaping surface 38. In addition, care must be taken not to allow for excessive sag bending in those areas inboard of rail 26 after marginal edge portions 40 have sagged into contact with shaping surface 38. It is believed that rapid downward movement of auxiliary rail 34 from its raised to lowered position may accelerate the final shaping of the marginal edge portion 40 from their preliminary shape to its final desired shape.

Figure 9:
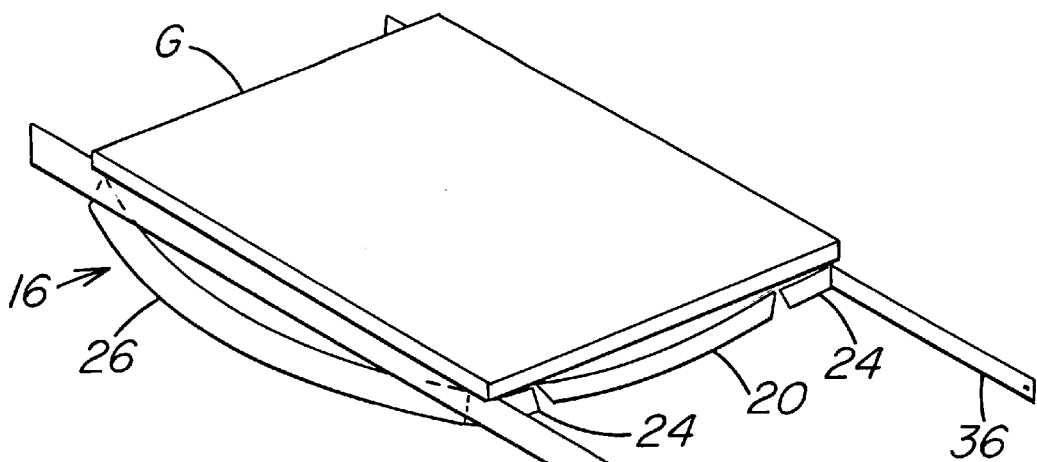
FIGS. 9, 10 and 11 are schematic perspective views generally corresponding to FIGS. 4, 5 and 6, respectively, showing the shaping sequence of a sheet supported on the outline rail of the present invention, with portions removed for clarity.
Figure 10:
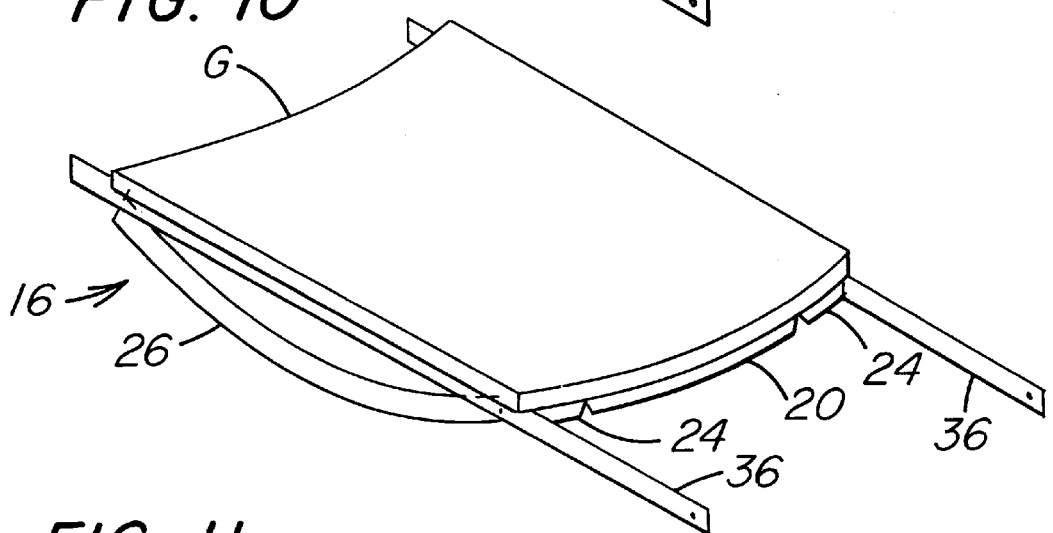
Figure 11:
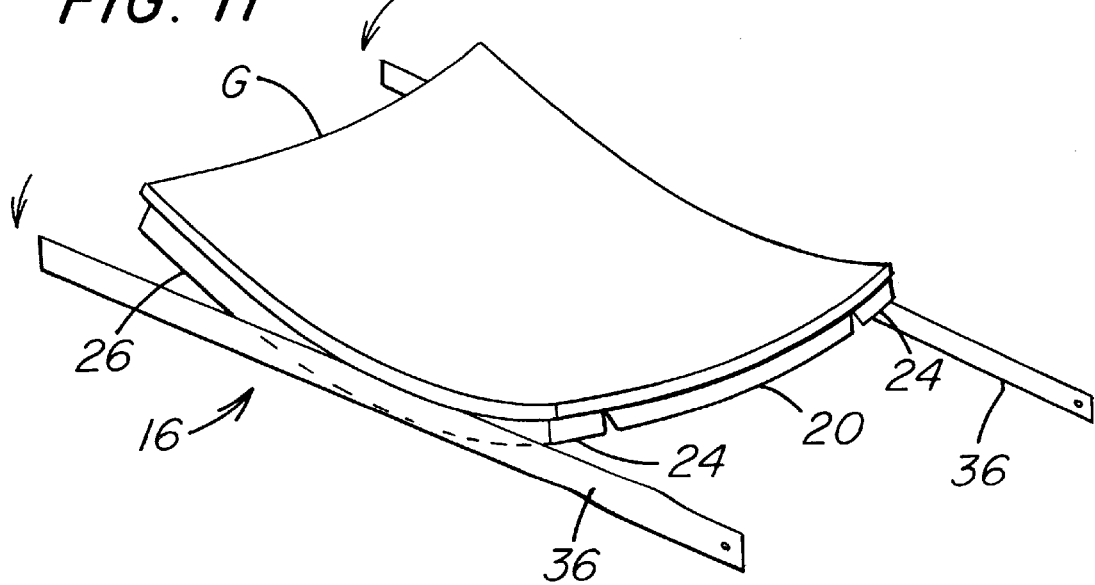

In operation, the ring mold 16 of the present invention shapes the sheets first in one direction to preliminarily shape the sheets generally in the longitudinal direction and subsequently in a second direction to impart a transverse curvature and shape the sheets to their final desired configuration. More specifically, end sections 22 of the ring mold 16 are pivoted downward and auxiliary rails 34 (one on each section 22) are moved to their raised position, as shown in FIGS. 4 and 9, either manually or by an automatic rail positioning arrangement. Glass sheets G (only one shown in FIGS. 4–6 and 9–11) are positioned on the ring mold 16 and supported on rails 34 and end sections 74 of side rails 20. As the sheets are heated, they soften and sag by gravity. Marginal edge portions 76 along the longitudinal sides of the glass sheets G sag into contact with and are shaped by center rails 20 and rails 24 in end section 22 as weighted arms 32 (shown only in FIG. 1) pivot each end section 22 upward, as shown in FIGS. 5 and 10. The marginal edge portions 40 of the glass sheets G are supported on auxiliary rail 34, which is initially positioned above rail 26 of end section 22 and remain undeformed. As a result, the glass sheets G initially deform to assume their longitudinal curvature, i.e. a generally cylindrical curvature from one end section 22 to the other. During this preliminary shaping, there may be some transverse sag bending of the glass, i.e. between the center rails 20, but transverse sag bending of the sheets G is limited because the shaping surface 36 of each auxiliary rail 34 is configured to limit sag bending of marginal edge portions 40 of sheets G immediately inboard of auxiliary rails 34, as shown in FIGS. 5 and 10. At the desired time in the bending cycle, rails 34 are lowered, depositing marginal edge portions 40 onto rails 26 of end sections 22, as shown in FIGS. 6 and 11. The glass sheets G continue to sag by gravity for the time required by the marginal edge portions 40 to contact shaping surfaces 38 of rail 26 and complete the transverse shaping of the glass G in pivoting sections 22. After shaping is completed, the frame 10 and shaped glass sheet G are conveyed through the annealing and cooling sections (not shown) of lehr 12 where the glass sheets G are controllably cooled. The shaped sheets G are subsequently removed from the mold 16 for further processing.

During the sag bending operation, additional sheet shaping arrangements may be used to further deform the sheets. More specifically, partial or full surface press faces may contact the upper and/or lower major surfaces of the glass sheets G to contact and shape selected portions of the glass to a desired configuration, for example, as disclosed in U.S. Pat. No. 4,804,397. When additional pressing molds are used in combination with an articulating ring mold as disclosed herein to shape the glass, it is desirable to incorporate a locking device into the pivoting end sections 22 of mold 16 so that the end sections 22 do not rotate downward when the glass G is contacted and pressed to shape, as disclosed in U.S. Pat. No. 4,804,397.

As discussed earlier, in the embodiment of the invention illustrated in FIGS. 1 and 2, auxiliary rail 34 is a straight rail with a straight sheet shaping surface 36 positioned outboard of rail 26 and is moved vertically from its raised to lowered position. It is contemplated that the position and shape of the rail may be modified. For example, auxiliary rail 34 may extend only along a portion of rail 26 so that it does not support the entire marginal edge 40 of the sheets G. In addition, auxiliary rail 34 may be positioned inboard of rail 26 rather than outboard. Furthermore, although it is preferred that sheet shaping surface 36 of auxiliary rail 34 be positioned above sheet shaping surface 38 of rail 26 when rail 34 is at its raised position, it is contemplated that surface 36 may be positioned above only a portion of surface 38 so that marginal edge portion 40 of glass sheets G is supported on and preliminarily shaped by both the auxiliary rail 34 and rail 26. Auxiliary rail 34 may also be curved horizontally to conform to the horizontal contour of adjacent rail 26.

As discussed earlier, although it is preferred that the elevational contour of sheet shaping surface 36 of auxiliary rail 34 be straight in order to control sag bending in the side portions of the glass sheets G, especially in the vicinity of the marginal edge portions 40. However, it is contemplated that the surface 36 may be curved, provided that its curvature is less than the final desired contour of surface 38 of adjacent rail 26, i.e. it has a larger radius of curvature. For example, surface 36 of auxiliary rail 34 may have a radius of curvature on the order of about 177 inches (about 450 cm), while surface 38 of adjacent rail 26 has a radius of curvature on the order of about 89 inches (about 225 cm). Because surface 36 of rail 34 is "flatter" than surface 38 of adjacent rail 26, auxiliary rail 34 can preliminarily shape marginal edge portion 40 and allow some preliminary sag bending in the vicinity of marginal edge portions 40 during the majority of the sag bending operation and surface 38 of adjacent rail 26 can shape marginal edge portion 40 and the remaining portions of the glass sheets G to their final desired shape during the latter portion of the sag bending operation.

The present invention controls excessive gravity sag bending in glass sheets by limiting the amount of glass sag at selected areas of the glass sheets during a portion of the sag bending operation. The glass sheets are preliminarily formed about one axis and subsequently formed about a second axis. This is accomplished by allowing the opposing longitudinally extending marginal edge portions 74 of the glass sheets G to sag into contact with opposing rails 20 and 24 while supporting the transversely extending marginal edge portions 40 of the glass sheets G on auxiliary rails 34. As a result, the sheets G assume their general longitudinal curvature. Rails 34 are thereafter lowered to allow edge portions 40 to be supported by and sag into contact with rails 26 of end sections 22 facilitate sag bending of the glass sheets in the transverse direction, especially in the vicinity between rails 24 of end sections 22, and complete the shaping of the glass. By maintaining the marginal edge portions 40 in a generally flat configuration and delaying the transverse sag bending in these selected areas until late in the sag bending process, the contoured shape of the glass in the pivoting sections 22 is controlled and excess sag bending is minimized. In addition, reducing the excessive sag bending by controlling the rate and manner in which the glass is shaped will also reduce distortion in the glass sheet due to undesired reverse bending of the sheet, especially at its corners.

The invention described and illustrated herein represents a description of illustrative preferred embodiments thereof. It is understood and various changes may be made without departing from the gist of the invention defined in the claims as follows.

What is claimed is:

1. An apparatus for shaping a glass sheet, comprising:
   a support frame;
   a shaping rail supported on said frame the shaping rail having (1) a pair of spaced elongated members defined as a center section, each of the spaced members of the center section having a longitudinal axis extends in a first direction and being secured in a fixed position on said frame and (2) having a pair of movable shaping rail sections defined as a first movable shaping rail section and a second movable shaping rail section the first movable shaping rail section mounted adjacent one end of the center section and the second movable shaping rail mounted adjacent the other end of the center section the first and second rail sections are pivotally mounted for movement toward said support frame to a first position and away from said support frame to a second position wherein when the movable shaping rail sections are in the second position the shaping rail has a sheet shaping surface that conforms in elevation and outline to a final desired shape of a marginal edge of a glass sheet to be shaped; and
   at least one elongated auxiliary rail having a longitudinal axis, the at least one auxiliary rail having a sheet shaping surface, positioned adjacent one of the movable shaping rail sections of said shaping rail, wherein said movable shaping rail section has a sheet shaping surface portion generally corresponding to said final desired shape of a selected marginal edge portion of the sheet to be shaped, said auxiliary rail mounted for movement relative to said movable shaping rail section between a first position, and a second position such that the longitudinal axis of said auxiliary rail is transverse to the longitudinal axis of the elongated member of the center section, wherein when said auxiliary rail and said moveable shaping rail sections are each in their first position, portions of said sheet shaping surface of said auxiliary rail are above said sheet shaping surface portion of said movable shaping rail section and wherein when said auxiliary rail and said moveable shaping rail sections are each in their second position, said sheet shaping surface of said auxiliary rail is below said sheet shaping portion of said movable shaping rail section.

2. The apparatus as in claim 1 wherein said movable shaping rail section is mounted for pivotal movement from its first position to its second position and said auxiliary rail has a sheet shaping surface generally corresponding to a preliminary shape of said selected marginal edge portion of said sheet.

3. An apparatus for shaping a glass sheet, comprising:
   a support frame;
   a shaping rail supported on said frame and having a movable shaping rail section, said movable shaping rail mounted for pivotal movement toward said support frame to a first position and away from said support frame to a second position wherein when the movable shaping rail section is in the second position the shaping rail has a sheet shaping surface that conforms in elevation and outline to a final desired shape of a marginal edge of a glass sheet to be shaped; and
   at least one auxiliary rail having a sheet shaping surface generally corresponding to a preliminary shape of said selected marginal edge portion of said sheet, positioned adjacent the movable shaping rail section of said shaping rail, wherein said movable shaping rail section has a sheet shaping surface portion generally corresponding to said final desired shape of a selected marginal edge portion of the sheet to be shaped, said auxiliary rail mounted at one end for movement relative to said movable shaping rail section pivotally between a first position, and a second position wherein when said auxiliary rail and said moveable shaping rail are each in the first position, portions of said sheet shaping surface of said auxiliary rail are above said sheet shaping surface portion of said movable shaping rail section and wherein when said auxiliary rail and said moveable shaping rail are each in the second position, said sheet shaping surface of said auxiliary rail is below said sheet shaping portion of said movable shaping rail section.

4. The apparatus as in claim 1 further including an auxiliary rail support arrangement mounted on said frame for movement from a first position, wherein said support arrangement supports said auxiliary rail at said auxiliary rail's first position, to a second position wherein said support arrangement allows said auxiliary rail to drop from said auxiliary rail's first position to its second position.

5. The apparatus as in claim 1 further including lifters to vertically reciprocate said auxiliary rail between its first and second positions.

6. The apparatus as in claim 1 wherein said sheet shaping surface of said auxiliary rail has a straight profile.

7. The apparatus as in claim 6 wherein said auxiliary rail is positioned outboard of said movable shaping rail section and said sheet shaping surface of said auxiliary rail is completely above said sheet shaping surface portion of said movable shaping rail section when said auxiliary rail and said movable shaping rail section are each at their first position.

8. The apparatus as in claim 7 further including an auxiliary rail support arrangement mounted on said frame for movement from a first position, wherein said support arrangement supports said auxiliary rail at said auxiliary rail's first position, to a second position wherein said support arrangement allows said auxiliary rail to drop from said auxiliary rail's first position to its second position.

9. The apparatus as in claim 1 wherein said auxiliary rail has a horizontal curvature that generally corresponds to a horizontal curvature of said movable shaping rail section.

10. The apparatus as in claim 1 wherein said auxiliary rail is positioned outboard of said movable shaping rail section.

11. The apparatus as in claim 1 wherein said auxiliary rail is positioned inboard of said movable shaping rail section.

12. The apparatus as in claim 1 wherein said sheet shaping surface of said auxiliary rail is completely above said sheet shaping surface portion of said shaping rail section when said auxiliary rail and said movable shaping rail section are each at their first position.

13. An apparatus for shaping a glass sheet, comprising:
a support frame;
a shaping rail supported on said frame and having a movable shaping rail section movable toward said support frame to a first position and away from said support frame to a second position wherein when the movable shaping rail section is in the second position the shaping rail has a sheet shaping surface that conforms in elevation and outline to a final desired shape of a marginal edge of a glass sheet to be shaped; and
at least one auxiliary rail having a sheet shaping surface, positioned adjacent the movable shaping rail section of said shaping rail, wherein said movable shaping rail section has a sheet shaping surface portion generally corresponding to said final desired shape of a selected marginal edge portion of the sheet to be shaped, said auxiliary rail is pivotally mounted for movement relative to said movable shaping rail section between a first and second position wherein when said auxiliary rail and said moveable shaping rail section are each in their first position, portions of said sheet shaping surface of said auxiliary rail are above said sheet shaping surface portion of said movable shaping rail section and wherein when said auxiliary rail and said moveable shaping rail sections are each in their second position, said sheet shaping surface of said auxiliary rail is below said sheet shaping surface portion of said movable shaping rail section.

14. A method of shaping a glass sheet by gravity sag bending, including the steps of:
providing a shaping rail having a movable shaping rail section, the movable shaping rail section having an upper shaping surface, the movable shaping rail section movable from a first position to a second position wherein when the movable shaping rail section is in the second position the shaping rail has an upper shaping surface having an elevational contour and outline generally corresponding to a final desired shape of a marginal edge portion of a sheet to be shaped;
supporting an auxiliary rail adjacent the movable shaping rail section, the auxiliary rail mounted for movement between a first position and a second position, the auxiliary rail having an upper shaping surface generally corresponding to a preliminary shape of a selected marginal edge portion of the sheet to be shaped, wherein when said auxiliary rail and movable shaping rail sections are each in their first position portions of said shaping surface of said auxiliary rail are above portions of said upper shaping surface of said movable shaping rail section;
positioning the movable shaping rail section in its first position and the auxiliary rail in its first position;
placing said sheet on said shaping rail with an end portion of the sheet on said auxiliary rail such that said selected marginal edge portion of said sheet is supported by portions of said upper shaping surface of said auxiliary rail and above said upper shaping surface of said movable shaping rail section;
heating said sheet to its heat softening temperature such that a first portion of said sheet sags by gravity into contact with portions of said upper shaping surface of said shaping rail and said selected marginal edge portion of said sheet contacts said upper shaping surface of said auxiliary rail, to preliminarily shape said sheet; and
moving said movable shaping rail section toward its second position while moving said auxiliary rail toward its second position to deposit said selected marginal edge portion of said sheet onto said movable shaping rail section so as to allow said selected marginal edge portion of said sheet to sag into contact with portion of said upper shaping surface of said movable shaping rail section and allow a sheet to sag to its final desired configuration.

15. The method as in claim 14 further including the step of providing said upper shaping surface of said auxiliary rail with a straight elevational profile.

16. The method as in claim 14 wherein said auxiliary rail is positioned outboard of said moveable shaping rail section.

17. The method as in claim 14 wherein said upper shaping surface of said auxiliary rail is above the entire upper shaping surface of said movable shaping rail section when its auxiliary rail is in said first position.

18. The method as in claim 14 wherein the sheet is one of two sheets and further including the step of contacting at least a portion of a major surface of at least one of said sheets with a press face having a sheet shaping surface generally corresponding to its final desired configuration of the sheets.

19. A method of shaping a glass sheet by gravity sag bending, including the steps of:
providing a shaping ring having opposing longitudinally extending rails and on each end of the rails a movable shaping rail section defined as a first movable rail section and a second movable rail section, each movable rail section movable from a first position to a second position wherein when said movable rails are each in the second position the shaping ring has an upper shaping surface with an elevational contour generally corresponding to a final desired shape of a marginal edge portion of a sheet to be shaped;
positioning an auxiliary rail adjacent each one of the movable rail sections wherein the auxiliary rail adjacent the first movable rail section is defined as a first auxiliary rail and the auxiliary rail adjacent the second movable rail section is defined as a second auxiliary rail, each of the auxiliary rails having an upper shaping surface with a straight elevational profile, wherein each of said auxiliary rails are movable between a first position and a second position said upper shaping surface of said auxiliary rails is above said upper shaping surface of said corresponding movable shaping rail section when the auxiliary rail and the corresponding movable shaping rail section are each in the first position;

positioning the auxiliary rails in their first position and the movable rail sections in their first position;

placing said sheet on said shaping ring such that at least first selected marginal edge portions of said sheet are supported by said upper shaping surface of said auxiliary rails and second selected marginal edge portion of the sheet are above said longitudinally extending rails of the shaping ring;

heating said sheet to its heat softening temperature such that the second selected marginal edge portions of said sheet sag by gravity into contact with an upper shaping surface of said longitudinally extending rails of the shaping ring to impart a preliminarily shape to said sheet; and moving said auxiliary rails toward their respective second position while moving the movable shaping rail sections toward their respective second position to deposit said first selected marginal edge portions of said sheet onto the movable shaping rail sections to allow said first selected marginal edge portion of said sheet to sag into contact with upper shaping surfaces of said movable rail sections and sag to a final desired configuration.

20. The apparatus as in claim 1 wherein said auxiliary rail has a sheet shaping surface generally corresponding to a preliminary shape of said selected marginal edge portion of said sheet.

21. The apparatus as in claim 20 wherein said at least one auxiliary rail is pivotally mounted at one end.

22. The apparatus according to claim 1 wherein said at least one auxiliary rail is a first auxiliary rail positioned adjacent the first movable shaping rail section and further including a second auxiliary rail positioned adjacent the second movable rail section, said second auxiliary rail having a sheet shaping surface, positioned adjacent second movable shaping rail sections of said shaping rail, wherein said second movable shaping rail section has a sheet shaping surface portion generally corresponding to said final desired shape of a selected marginal edge portion of the sheet to be shaped, said second auxiliary rail mounted for movement relative to said second movable shaping rail section between a first position, and a second position wherein when said second auxiliary rail and said second moveable shaping rail sections are in their first position, portions of said sheet shaping surface of said second auxiliary rail are above said sheet shaping surface portion of said second movable shaping rail section and wherein when said second auxiliary rail and said second moveable shaping rail sections are each in their second position, said sheet shaping surface of said second auxiliary rail is below said sheet shaping portion of said second movable shaping rail section.

* * * * *